US012640388B2

(12) United States Patent
Park et al.

(10) Patent No.: US 12,640,388 B2
(45) Date of Patent: May 26, 2026

(54) METHOD AND APPARATUS FOR MANUFACTURING BATTERY UNIT CELL

(71) Applicant: LG Energy Solution, Ltd., Seoul (KR)

(72) Inventors: Dong Hyeuk Park, Daejeon (KR); Sin Young Park, Daejeon (KR); Sung Chul Park, Daejeon (KR); Tae Won Kang, Daejeon (KR); Ju Hyung Kim, Daejeon (KR); Gi Yang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 539 days.

(21) Appl. No.: 18/032,734

(22) PCT Filed: Dec. 23, 2021

(86) PCT No.: PCT/KR2021/019761
§ 371 (c)(1),
(2) Date: Apr. 19, 2023

(87) PCT Pub. No.: WO2022/139519
PCT Pub. Date: Jun. 30, 2022

(65) Prior Publication Data
US 2023/0387447 A1      Nov. 30, 2023

(30) Foreign Application Priority Data

Dec. 23, 2020    (KR) ........................ 10-2020-0182655
Dec. 21, 2021    (KR) ........................ 10-2021-0184173

(51) Int. Cl.
*H01M 6/00*         (2006.01)
*H01M 10/04*        (2006.01)
*H01M 50/46*        (2021.01)

(52) U.S. Cl.
CPC ....... *H01M 10/0404* (2013.01); *H01M 50/46* (2021.01)

(58) Field of Classification Search
CPC ......... H01M 10/0404; H01M 10/0409; H01M 10/0422; H01M 10/0431; H01M 10/045;
(Continued)

(56) References Cited

U.S. PATENT DOCUMENTS

2014/0363729 A1    12/2014  Kim et al.
2019/0237797 A1     8/2019  Cho et al.

FOREIGN PATENT DOCUMENTS

CN         108878988  A      11/2018
CN         211838756  U      11/2020
(Continued)

OTHER PUBLICATIONS

Extended European Search Report including Written Opinion for Application No. 21911584.7 dated Sep. 23, 2024. 8 pgs.
(Continued)

*Primary Examiner* — Raymond Alejandro
(74) *Attorney, Agent, or Firm* — Lerner David LLP

(57)               ABSTRACT

An apparatus for manufacturing a unit cell including a first and second roller is provided. The first roller is positioned on a first side of the first and second separators. The second roller is positioned on a second side of the first and second separators opposite the first side wherein the second roller is aligned with the first roller along an axis and defines an oval shape having a long axis and a short axis. The second roller is configured to contact the second separator and press the first and second separators against the first roller at portions of the first and second separators which are between adjacent electrodes. One of the lower roller or the upper roller is heated so as to thermally fuse the separators together.

17 Claims, 6 Drawing Sheets

(58) Field of Classification Search
    CPC ........ H01M 10/0468; H01M 10/0481; H01M
              50/46; H01M 50/463; H01M 50/471
    See application file for complete search history.

(56)               References Cited

FOREIGN PATENT DOCUMENTS

| | | | | |
|---|---|---|---|---|
| GB | 907052 | A | 10/1962 | |
| JP | 2012199210 | A | 10/2012 | |
| JP | 2013004192 | A | 1/2013 | |
| JP | 2016-103450 | A | 6/2016 | |
| JP | 2016157577 | A | 9/2016 | |
| JP | WO2015145551 | A1 | 4/2017 | |
| JP | 2017135018 | A | 8/2017 | |
| JP | 2019029267 | A | 2/2019 | |
| JP | 2019135699 | A | 8/2019 | |
| JP | 6733190 | B2 | 7/2020 | |
| KR | 200314731 | Y1 * | 5/2003 | ......... B32B 37/0053 |
| KR | 20070013575 | A | 1/2007 | |
| KR | 101306686 | B1 | 9/2013 | |
| KR | 20140106123 | A | 9/2014 | |
| KR | 101625602 | B1 | 5/2016 | |
| KR | 101749148 | B1 | 6/2017 | |
| KR | 20180001458 | A | 1/2018 | |
| KR | 20180057847 | A | 5/2018 | |
| KR | 101881584 | B1 | 7/2018 | |
| KR | 20190056812 | A | 5/2019 | |
| KR | 102045248 | B1 | 11/2019 | |
| KR | 102082654 | B1 | 2/2020 | |
| WO | 2013031213 | A1 | 3/2013 | |

OTHER PUBLICATIONS

International Search Report for PCT/KR2021/019761 mailed Apr. 6, 2022. 3 pages.
Search Report dated Dec. 16, 2025 from the Office Action for Chinese Application No. 202180067371.X issued Dec. 18, 2025, pp. 1-3.

* cited by examiner

PRIOR ART

Unable to adhere

<A>          <B>

METHOD AND APPARATUS FOR MANUFACTURING BATTERY UNIT CELL

CROSS-REFERENCE TO RELATED APPLICATIONS

The present application is a national phase entry under 35 U.S.C. § 371 of International Application No. PCT/KR2021/019761, filed on Dec. 23, 2021, which claims the benefit of the priority of Korean Patent Application Nos. 10-2020-0182655, filed on Dec. 23, 2020, and 10-2021-0184173, filed on Dec. 21, 2021, which are hereby incorporated by reference in their entirety.

TECHNICAL FIELD

The present invention relates to a method and apparatus for manufacturing a unit cell, and more particularly, to a method and apparatus for manufacturing a unit cell, in which a portion to be cut at a lower separator and an upper separator is previously bonded (sealed) before cutting the lower separator and the upper separator to prevent a separator from being folded.

BACKGROUND ART

Unlike a primary battery, since a secondary battery may be rechargeable and also be miniaturized and have large capacity, a lot of research and development has been carried out in recent years. Also, as technology development and demand for mobile devices increases, the demand for secondary batteries as energy sources is rapidly increasing.

Such a secondary battery is configured so that an electrode assembly and an electrolyte are embedded in a case (for example, a pouch, a can, and the like). The electrode assembly mounted in the case is repeatedly chargeable and dischargeable because of a structure in which a positive electrode, a separator, and a negative electrode are stacked. The electrode assembly is manufactured in various manners. However, generally, the electrode assembly may be manufactured in a manner in which, after a unit cell 4 is prepared in advance, a plurality of units 4 are stacked to manufacture the electrode assembly.

That is, referring to FIG. 1, which illustrates a state in which a unit cell is manufactured according to the related art, in a method for manufacturing the unit cell 4 according to the related art, a positive electrode 1, an upper separator 3a, a negative electrode 2, and a lower separator 3b are continuously wound to be supplied in a state in which each of the positive electrode 1, the upper separator 3a, the negative electrode 2, and the lower separator 3b is wound in the form of a roll (however, stacking positions of the positive electrode and the negative electrode may be changed).

The separators 3 (3a and 3b) are continuously supplied without disconnection, the negative electrode 2 is supplied between the upper separator 3a and the lower separator 3b, and the positive electrode 1 is supplied onto the upper separator 3a, on a side of the upper separator opposite the negative electrode 2.

Here, the separators 3 are continuously supplied without being cut. On the other hand, the positive electrode 1 and the negative electrode 2 are provided in a state of being cut to predetermined sizes by respective cutters 6 and 7, respectively. The positive electrode 1 and the negative electrode 2 are paired to be aligned and stacked vertically with the upper separator 3a therebetween and are disposed to be spaced a predetermined distance from the respective adjacent positive electrode 1 and negative electrode 2.

That is, the separators 3 are continuously connected, and the negative electrode 2 and the positive electrode 1 pass through a laminating device 9 in a state of being spaced a predetermined distance from the adjacent negative electrode 2 and the positive electrode 1, respectively. In the laminating device 9, heat and a pressure are applied so that the negative electrode 2 and the positive electrode 1 are bonded to contact points with the separators 3.

After the positive electrode 1 and the negative electrode 2 pass through the laminating device 9 in a state of being bonded to the separator 3, the positive electrode 1 and the negative electrode 2 pass through a pressing device 5 constituted by cylindrical rollers, which are disposed vertically in pairs, so as to be additionally pressed.

Then, the separator 3 is cut between the adjacent positive electrode 1 and the positive electrode 1 by a cutter 8 and then is provided to individual unit cells 4.

That is, after the electrodes 1 and 2 and the separator 3 are bonded to each other by applying heat and a pressure through the laminating device 9 and the pressing device 5, the cutting of the separators 3 are performed between the adjacent electrodes so that the separators 3 are manufactured into individual unit cells 4.

However, the cutter 8 has a structure in which the pressure is applied vertically to cut the separators 3. Thus, when any one of the separators 3a and 3b is not properly cut, there is a problem in that the separators 3a and 3b are folded in a direction in which the pressure is applied.

Also, after the unit cells 4 are manufactured, since the plurality of unit cells 4 are stacked to be manufactured as an electrode assembly, the folding of the separators 3 occurs, and thus, when a portion of the negative electrode 2 or the positive electrode 1 is exposed, a short circuit occurs inside the electrode assembly.

That is, the bonding is performed at points at which the separator 3 and the electrodes 1 and 2 are in contact with each other. However, in the structure according to the related art, the upper separator 3a and the lower separator 3b are not bonded to each other, and thus, when the cutting is performed by the cutter 8, or after the cutting is performed, there is a problem in that the separator may not be fixed, but may be folded.

DISCLOSURE OF THE INVENTION

Technical Problem

Therefore, an object of the present invention is to provide a method and apparatus for manufacturing a unit cell, in which an upper separator and a lower separator are bonded (sealed) before the separators are cut (before points of the separators, at which the separators are to be cut, reach a cutter 8) to prevent the upper separator and the lower separator from being folded when the separators are cut.

Technical Solution

An apparatus for manufacturing a unit cell, which cuts a lower separator and an upper separator between electrodes (a positive electrode and a negative electrode) adjacent to each other (in a longitudinal direction of the separator) in a process of manufacturing the unit cell provided in a state (i.e., a stacked state in the order of the 'positive electrode/upper separator/negative electrode/lower separator' or the 'negative electrode/upper separator/positive electrode/lower separator' from top to bottom), in which the lower separator and the upper separator continuously move in a longitudinal direction, and the electrodes are stacked between the lower separator and the upper separator and on the upper separator, respectively, according to the present invention for achieving the above object comprises: a lower roller disposed under the lower separator; and an upper roller which is disposed above the upper separator so as to be vertically aligned with the lower roller and has an oval shape with a long axis and a short axis, wherein, when the electrodes pass while the upper roller rotates, the upper roller is not in contact with the upper separator, and after the electrodes pass, the upper roller presses the upper separator and the lower separator to a surface of the lower roller, and at least one of the lower roller or the upper roller is heated to a predetermined temperature to thermally fuse points at which the upper separator and the lower separator are pressed.

The upper roller and the lower roller may be disposed to thermally fuse the upper separator and the lower separator before the upper separator and the lower separator are cut.

A portion at which the upper roller is in contact with the separator may be made of a material having elasticity.

The upper roller may comprise: a core part made of a material having relatively higher hardness; and a surface part, which is coupled to cover a surface of the core part, made of relatively higher elasticity, and in contact with the upper separator.

The surface part may be made of material having shore hardness in a range of HS20 to HS40.

Any one or more of the lower roller and the upper roller may be heated up to a range of 60° C. to 110° C.

When the lower roller and the upper roller press the lower separator and the upper separator, a pressure applied between the lower roller and the upper roller may be set in a range of 100 kg to 1,000 kg.

The lower roller may be heated, and the upper roller may be not heated. The lower roller may not be heated, and the upper roller may be heated. Both the lower roller and the upper roller may be heated.

Furthermore, a method for manufacturing a unit cell, in which electrodes are stacked between a lower separator and an upper separator and on the upper separator, respectively, which is provided is the present invention, comprises: a process of providing the electrodes and the separators in a state in which the lower separator and the upper separator continuously move in a longitudinal direction, and the electrodes are stacked between the lower separator and the upper separator and on the upper separator, respectively; and a process of allowing the electrodes and the separator to pass between the lower roller disposed under the lower separator and the upper roller disposed to be vertically aligned with the lower roller above the upper separator and having an oval shape with a short axis and a long axis, wherein, when the electrodes pass while the upper roller rotates, the upper roller is not in contact with the upper separator, and after the electrodes pass, the upper roller presses the upper separator and the lower separator to a surface of the lower roller, and at least one of the lower roller or the upper roller is heated to a predetermined temperature to thermally fuse points at which the upper separator and the lower separator are pressed.

The upper roller and the lower roller may be disposed to thermally fuse the upper separator and the lower separator before the upper separator and the lower separator are cut.

The upper roller may be made of a material having elasticity so that, when the upper separator is pressed, the upper separator is pressed by elastic force of the material of the upper roller.

Advantageous Effects

The present invention having the configuration as described above may comprise the upper roller having the oval shape and the lower roller having the circular shape. Here, at least one or more of the upper roller and the lower roller may be heated at the predetermined temperature, and the long axis of the upper roller may press the separators to bond (thermally fuse) the upper separator to the lower separator. Therefore, after the cutting is performed, the folding of the separator may be prevented.

The portion at which the upper roller and the separator are in contact with each other may be made of the material having the elasticity to prevent the separator from being damaged when being pressed.

MODE FOR CARRYING OUT THE INVENTION

Figure 1:
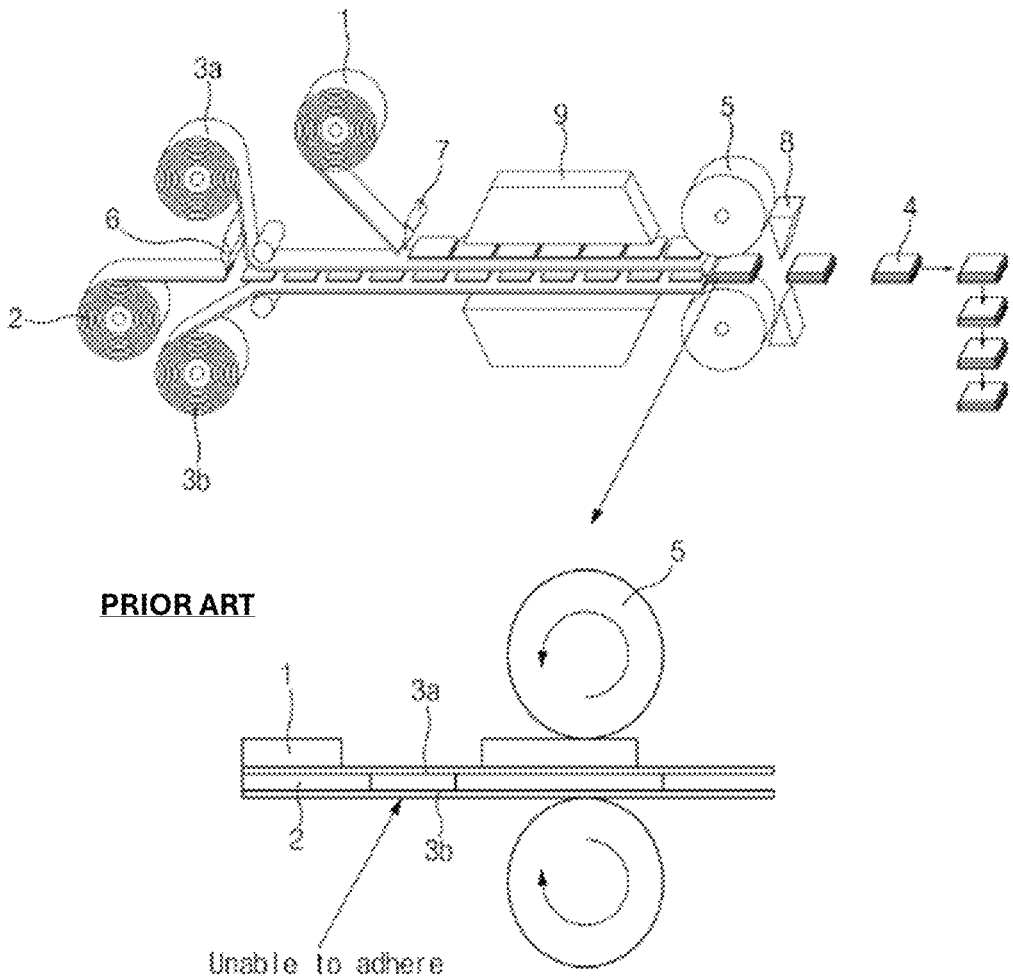
FIG. 1 is a schematic view illustrating a state in which a unit cell is manufactured through a method according to a related art.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a method and apparatus for manufacturing a unit cell 4 in which electrodes 1 and 2 are respectively stacked between a lower separator 3b and an upper separator 3a and on the upper separator 3a. Hereinafter, embodiments according to the present invention will be described in more detail with reference to the accompanying drawings.

First Embodiment

The present invention provides a method for manufacturing a unit cell according to a first embodiment. The apparatus for manufacturing the unit cell provided in this embodiment may be added between a pressing device 5 and a cutter 8 in a process illustrated in FIG. 1 or may be installed instead of the pressing device 5.

Figure 2:
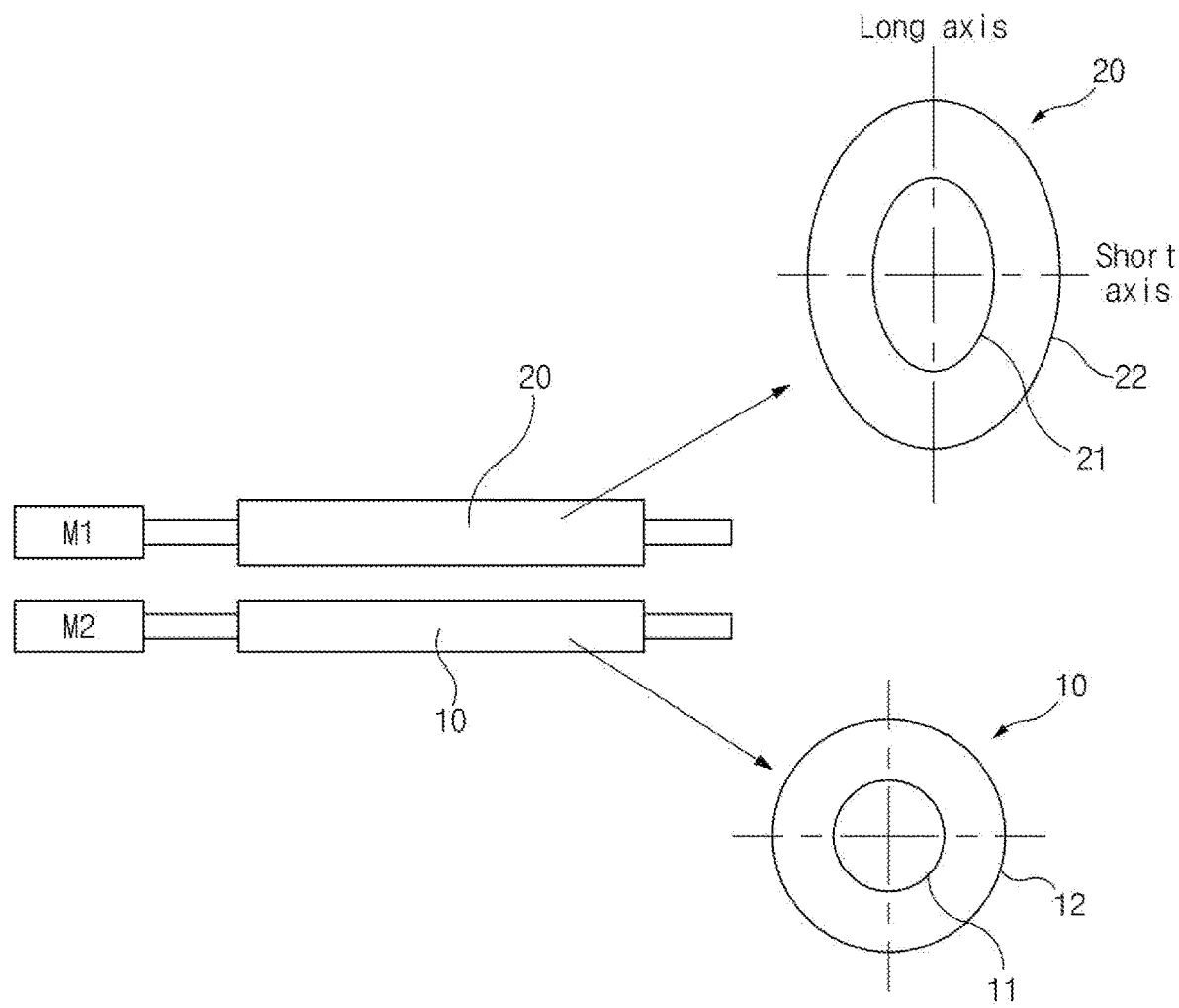
FIG. 2 is a simplified front view (left drawing) of an apparatus for manufacturing a unit cell and a cross-sectional view (right drawing) of each of an upper roller and a lower roller according to an embodiment of the present invention.
Figure 3:
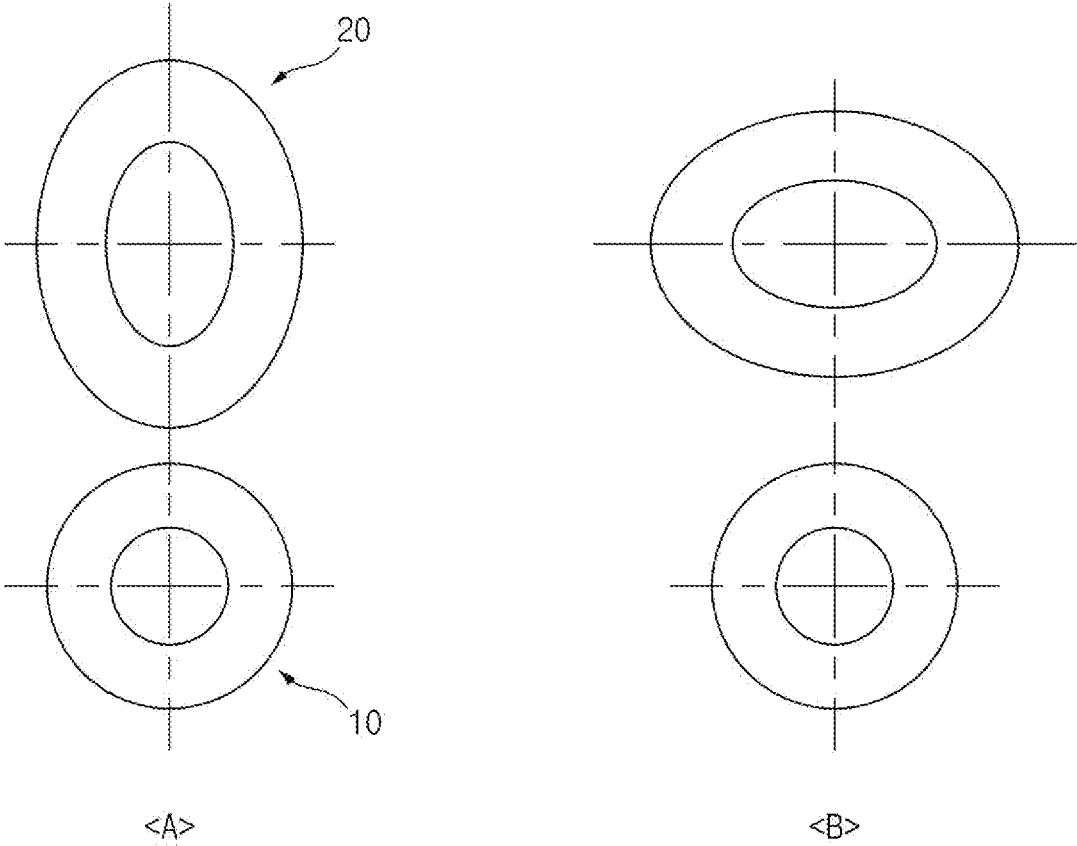
FIG. 3 is a view illustrating a state <A> when a long axis of the upper roller is perpendicular to the lower roller and a state <B> when a short axis of the upper roller is perpendicular to the lower roller.

FIG. 2 is a simplified front view (left drawing) of an apparatus for manufacturing a unit cell and a cross-sectional view (right drawing) of each of an upper roller and a lower roller according to an embodiment of the present invention, and FIG. 3 is a view illustrating a state <A> when a long axis of the upper roller is perpendicular to the lower roller and a state <B> when a short axis of the upper roller is perpendicular to the lower roller.

As illustrated in the drawings, the apparatus for manufacturing the unit cell according to the present invention comprises a lower roller 10 and an upper roller 20. The upper roller 20 and the lower roller 10 are disposed to thermally fuse an upper separator 3a to a lower separator 3b before the upper separator 3a and the lower separator 3b are cut.

As the apparatus for manufacturing the unit cell, which is provided in this embodiment, is provided in place of a pressing device 5 according to the related art or is additionally provided between the pressing device 5 and a cutter 8, in the separator 3 and the electrodes 1 and 2, the lower separator 3b and the upper separator 3a continuously move in a longitudinal direction and are provided in a state in which a positive electrode 1 and a negative electrode 2 are stacked between the lower separator 3b and the upper separator 3a and on the upper separator 3a, respectively, i.e., a state in which a 'positive electrode/upper separator/negative electrode/lower separator' or a 'negative electrode/upper separator/positive electrode/lower separator' are sequentially stacked from top to bottom.

The lower roller 10 has a circular shape and is disposed under the lower separator 3b. In addition, the lower roller 10 is configured to be heated to a predetermined temperature through a heater (not shown) or the like.

In this embodiment, the lower roller 10 may be heated up to a range of 60° C. to 110° C. The reason in which the temperature is limited to the range of 60° C. to 250° C. is because, when the temperature is less than 60° C., it is difficult to achieve efficient thermal fusion of the separator 3, and when the temperature exceeds 110° C., it is difficult to seal the separator 3 due to the melted (deformed or damaged) separator 3.

In addition, the upper roller 20 is disposed to be vertically aligned with the lower roller 10 above the upper separator 3a and is configured to have an oval shape having a short axis and a long axis. The upper roller 20 may also be heated up to a range of 60° C. to 110° C. through an external heater (not shown).

Thus, as illustrated in FIG. 3, when the long axis is erected vertically (as shown in <A>), an interval between the upper roller 20 and the lower roller 10 is relatively small, and when the short axis is erected vertically (as shown in <B>), an interval between the upper roller 20 and the lower roller 10 is relatively large. That is, the interval between the upper roller 20 and the lower roller 10 varies according to a rotational position of the upper roller 20.

As illustrated in FIG. 2, the upper roller 20 and the lower roller 10 axially rotate by motors M1 and M2, respectively, and are disposed to be maintained at a constant interval along a width direction (left and right direction in FIG. 2). A rotation speed of each of the motors M1 and M2 may be adjusted according to a transfer speed of each of the separators 3a and 3b, and the lower roller 10 and the upper roller 20 may rotate at the same time by using one motor. When the upper roller 20 is in contact with the upper separator 3a, a portion at which the upper roller 20 is in contact with the upper separator 3a is made of a material having elasticity to prevent the separators 3a and 3b from being damaged.

That is, the upper roller 20 may comprise a core part 21 made of a material having relatively higher hardness and a surface part 22, which is coupled to cover a surface of the core part 21, made of relatively higher elasticity, and in contact with the upper separator 3a.

The surface part 22 may be made of a rubber material or a silicone material having appropriate elasticity and may have shore hardness in a range of HS20 to HS40. In addition, the core part 21 is made of a metal material having higher hardness to support the surface part when the surface part is elastically deformed.

Figure 4:
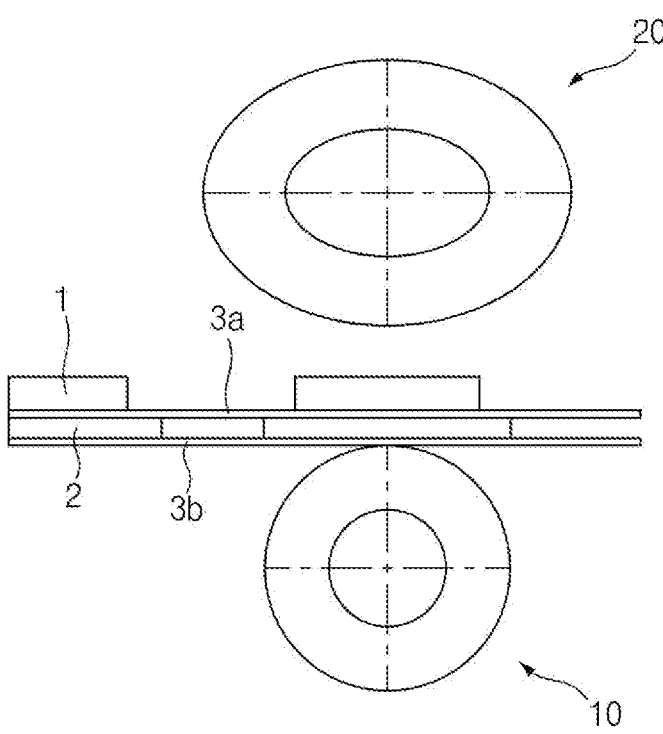
FIG. 4 is a view illustrating a state in which the short axis of the upper roller is perpendicular to the lower roller when an electrode is disposed between the upper roller and the lower roller.
Figure 5:
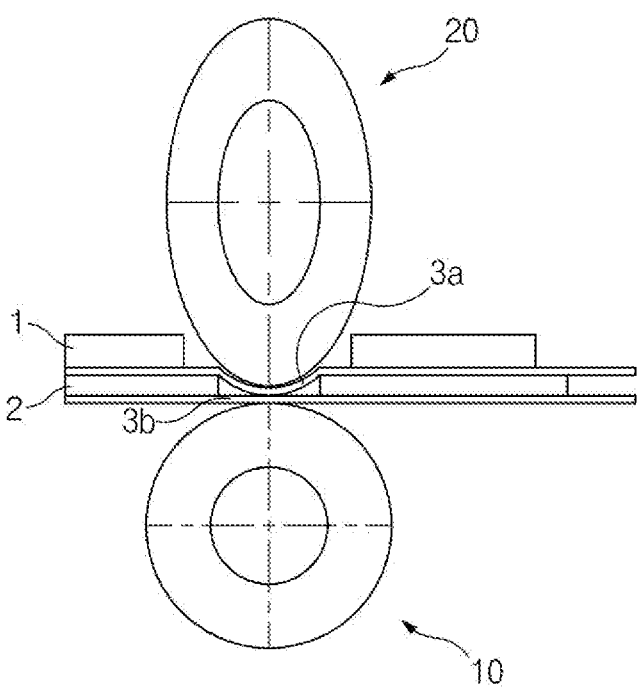
FIG. 5 is a view illustrating a state in which the long axis of the upper roller is perpendicular to the lower roller and presses separators when only the separators are disposed between the upper roller and the lower roller.
Figure 6:
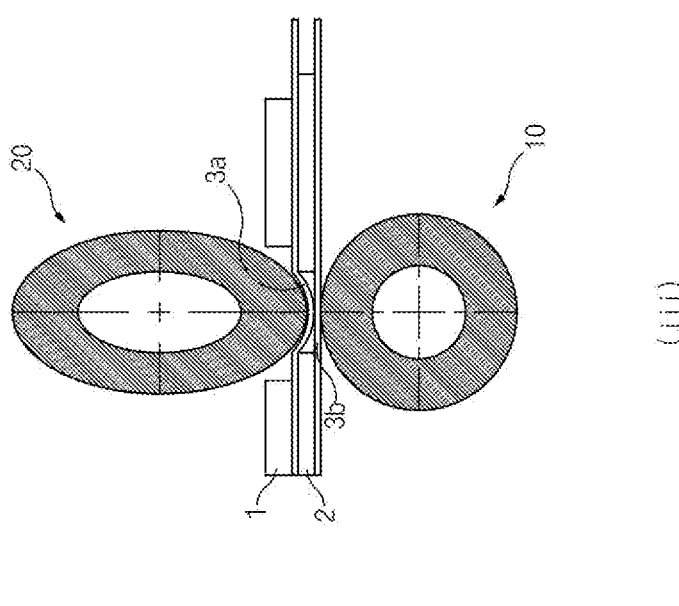
FIG. 6 is a view illustrating a state (i), in which the upper roller is heated, and the lower roller is not heated, a state (ii), in which the upper roller is not heated, and the lower roller is heated, and a state (iii), in which all of the upper roller and the lower roller are heated.
Figure 6:
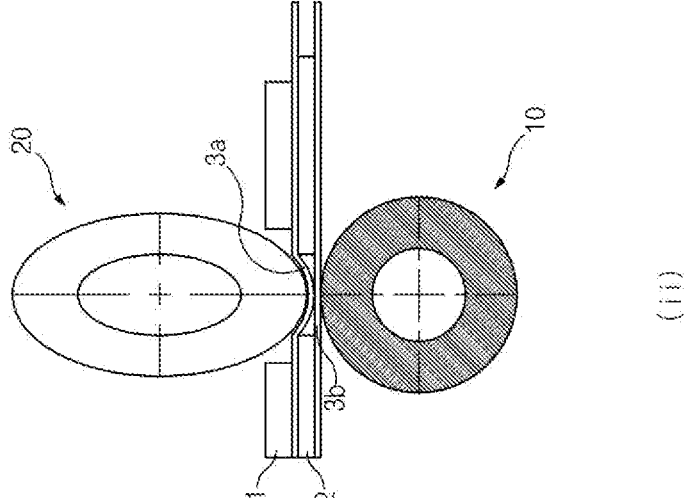
Figure 6:
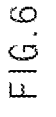
Figure 6:
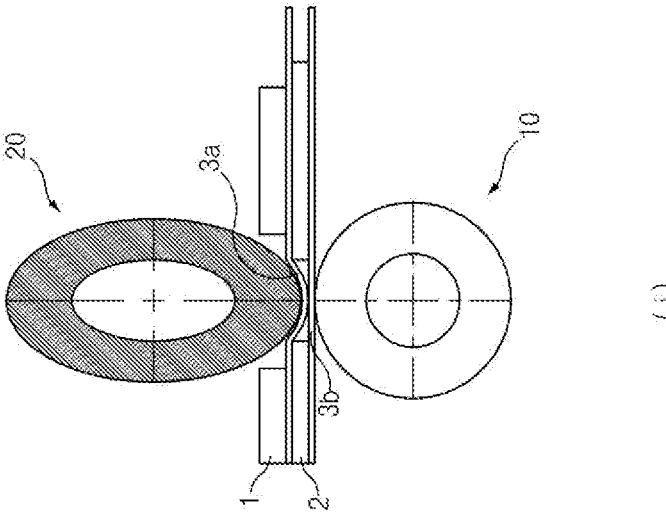

FIG. 4 is a view illustrating a state in which the short axis of the upper roller 20 is perpendicular to the lower roller 10 when the electrode is disposed between the upper roller 20 and the lower roller 10, and FIG. 5 is a view illustrating a state in which the long axis of the upper roller is perpendicular to the lower roller 10 and presses the separators 3a and 3b when only the separators 3a and 3b are disposed between the upper roller 20 and the lower roller 10. Also, FIG. 6 is a view illustrating a state (i), in which the upper roller is heated, and the lower roller is not heated, a state (ii), in which the upper roller is not heated, and the lower roller is heated, and a state (iii), in which all of the upper roller and the lower roller are heated.

Referring to FIGS. 4 and 5, the upper roller 20 and the lower roller 10 of the apparatus for manufacturing the unit cell, which is provided in this embodiment, is installed before the separators 3 reach the cutter 8. When the electrodes 1 and 2 pass during the rotation of the upper roller the upper roller 20 is not in contact with the upper separator 3a, and after the electrodes 1 and 2 pass, and the upper roller 20 presses the upper separator 3a and the lower separator 3b to the surface of the lower roller 10.

That is, while the electrodes 1 and 2 pass under the upper roller 20, the upper roller 20 has a posture or orientation in which the short axis is oriented in a vertical direction (a direction in which the short axis is placed vertically). Thus, the upper roller 20 is not in contact the uppermost positive electrode 1. In addition, when the separator 3 moves (in a right direction in FIG. 4), the upper roller 20 also rotates (in a counterclockwise direction). Thus, when the long axis of the upper roller 20 rotates to be disposed vertically (a direction in which the long axis is disposed vertically), the upper separator 3a starts to be pressed so as to be in contact with the lower separator 3b.

Here, at least one of the lower roller 10 rotating under the lower separator 3b and/or the upper roller 20 rotating above the upper separator 3a is in a state of being heated to a predetermined temperature. In addition, since the upper separator 3a and the lower separator 3b are pressed to the surface of the lower roller 10, the lower separator 3b is thermally fused and sealed to the upper separator 3a.

In addition, when the thermal fusion of the separators 3a and 3b is achieved, the upper roller 20 rotates in the counterclockwise direction based on FIG. 5 to rotate as illustrated in FIG. 4, and then, when the next electrodes 1 and 2 are passed, the upper separator 3a and the lower separator 3b are thermally fused again in the same manner.

The point at which the thermal fusion is achieved in this manner is cut by the cutter 8 illustrated in FIG. 1 to manufacture the unit cell 4.

A pressure applied to the separator 3 may vary according to the material of the upper roller 20 and the interval between the upper roller 20 and the lower roller 10. Here, when a thickness of the separator made of a polyethylene (PE) material is 8 μm to 20 μm, it is preferable that a pressure applied to each of the lower separator and the upper separator by the lower roller 10 and the upper roller 20 is set in a range of 100 kg to 1,000 kg per unit area (1 cm² or 1 m²).

Furthermore, the lower roller 10 has a cylindrical shape. If the lower roller 10 is configured to efficiently transfer the heat of the heater 11 comprised therein to a surface of a housing 12, the lower roller 10 is not limited to a specific structure, but is preferably that straightness is or less, surface roughness is Ra 0.8 or less, and centrifugation is 8/1000 or less so that the portion to be sealed is evenly maintained in sealing quality.

In the method for manufacturing the unit cell according to the present invention, the upper roller 20 and the lower roller 10 may be configured to be heated in consideration of the material or thickness of each of the separators 3a and 3b, the interval between the electrodes, the heating temperature, and the like.

That is, as illustrated in FIG. 6, i.e., as illustrated in the left drawing (i), only the upper roller 20 may be heated in a state in which the lower roller 10 is not heated. In this case, since heat is not unnecessarily transferred to the electrodes 1 and 2 (by the heated lower roller), thermal damage of the electrodes 1 and 2 may be prevented.

In addition, as illustrated in the middle drawing (ii), the upper roller 20 may not be heated in a state in which the lower roller 10 is heated. In this case, since the lower separator 3b is heated as a whole along the longitudinal direction, the thermal fusion quality may be adjusted by adjusting the pressing force through the upper roller 20. Particularly, when the heat transfer through the upper roller is difficult according to the material of the surface part, the rollers may be configured in this manner.

In addition, as illustrated in the right drawing (iii), both the lower roller 10 and the upper roller 20 may be heated. In this case, heat may be uniformly transferred to the upper separator 3a and the lower separator 3b to improve thermal fusion efficiency.

Therefore, the apparatus for manufacturing the unit cell, which is provided in this embodiment may be configured so that at least one or both of the upper roller 20 and the lower roller 10 is/are heated according to the required specification of the thermal fusion, the configurations of the upper roller 20 and the lower roller 10, the thickness or type of each of the separators 3a and 3b, or the like.

Second Embodiment

In the present invention, a method for manufacturing a unit cell, which is capable of manufacturing the unit cell using the above-described manufacturing apparatus is provided as a second embodiment.

The manufacturing method provided in this embodiment comprises a process of laminating electrodes 1 and 2 and a separator 3 after stacking the electrodes 1 and 2 and the separator 3 in a predetermined order to provide the electrodes 1 and 2 and the separator 3 and a process of allowing the separator 3 to pass between the upper roller 2 and the lower roller 10.

That is, in the process of providing the electrodes 1 and 2 and the separator 3, a lower separator 3b and an upper separator 3a continuously move in a longitudinal direction, and also, the electrodes 1 and 2 and the separators 3 are provided in a state in which the electrodes 1 and 2 are stacked between the lower separator 3b and the upper separator 3a and on the upper separators 3a, respectively.

In addition, in the process of allowing the separator 3 to pass between the upper roller 20 and the lower roller 10, the electrodes 1 and 2 and the separator 3 are configured to pass between the lower roller 10 disposed under the lower separator 3b and the upper roller 20 disposed to be vertically aligned with the lower roller 10 above the upper separator 3a and having an oval shape with a short axis and a long axis.

Here, when the electrodes 1 and 2 pass while the upper roller 20 rotates, the upper roller 20 is not in contact with the upper separator 3a and the positive electrode 1 stacked at the uppermost layer, and after the electrodes 1 and 2 pass, the upper roller 20 presses the upper separator 3a and the lower separator 3b to a surface of the lower roller 10 so as to be thermally fused. Here, the upper roller 20 is made of a material having elasticity so that, when the upper separator 3a is pressed, the upper separator 3a is pressed by the elastic force of the material of the upper roller 20. Here, at least one of the upper roller 20 or the lower roller 10 is heated to perform the thermal fusion at points at which the separators 3a and 3b are pressed.

The points at which the thermal fusion is achieved through the upper roller 20 and the lower roller 10 move to the next positions to be cut by a cutter 8.

The present invention having the configuration as described above comprises the upper roller 20 having an oval shape and the lower roller 10 having a circular shape, and at least one of the upper roller 20 and the lower roller 10 is heated to a predetermined temperature so that the long axis of the upper roller 20 presses the separators 3a and 3b to bond (thermally fuse) the upper separator 3a to the lower separator 3b. Thus, since the sealing of the cut points are performed, the separators 3a and 3b are fixed after the cutting so as to prevent from being folded.

The portion at which the upper roller 20 and the separator 3 are in contact with each other may be made of the material having the elasticity to prevent the separator 3 from being damaged when being pressed.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

1: Positive electrode
2: Negative electrode
3: Separator (3a: upper separator, 3b: lower separator)
10: Lower roller
11: Heater

9

12: Housing
20: Upper roller
21: Core part
22: Surface part

The invention claimed is:

1. An apparatus for manufacturing a unit cell, the apparatus being configured to seal first and second separators at intervals between adjacent electrodes while the first and second separators are continuously moved in a longitudinal direction, the apparatus comprising:

a first roller positioned on a first side of the first and second separators; and a second roller positioned on a second side of the first and second separators opposite the first side, wherein the second roller is aligned with the first roller along an axis and defines an oval shape having a long axis and a short axis, wherein, the second roller is configured to rotate to intermittently contact the second separator and press the first and second separators against the first roller in a state in which the long axis is perpendicular to the first roller, at portions of the first and second separators which are between adjacent electrodes and to be cut, wherein the second roller is configured to rotate to be spaced apart from the second separator in a state in which the short axis is perpendicular to the first roller, when an electrode is disposed between the first roller and the second roller along portions of the first and second separators where the electrode is disposed, and at least one of the first roller or the second roller is heated to a predetermined temperature to intermittently thermally fuse the portions at which the second roller intermittently presses the first separator and the second separator are together against the first roller.

2. The apparatus of claim 1, wherein the first roller and the second roller are disposed to thermally fuse the first separator and the second separator before the upper separator and the lower separator are cut.

3. The apparatus of claim 1, wherein a portion at which the second roller is configured to contact the second separator is made of a material having elasticity.

4. The apparatus of claim 3, wherein the second roller comprises:

a core part made of a material having a first hardness; and a surface part, which covers a surface of the core part, is made of a first elasticity, and is configured to contact the second separator.

5. The apparatus of claim 4, wherein the surface part is made of material having shore hardness in a range of about HS20 to about HS40.

6. The apparatus of claim 1, wherein at least one of the first roller and the second roller are heated to a range of about 60° C. to about 110° C.

7. The apparatus of claim 4, wherein, when the first roller and the second roller press the first separator and the second separator, a pressure applied between the first roller and the second roller is in a range of about 100 kg to about 1,000 kg.

8. The apparatus of claim 1, wherein the first roller is heated, and the second roller is not heated.

9. The apparatus of claim 1, wherein the first roller is not heated, and the second roller is heated.

10. The apparatus of claim 1, wherein both the first roller and the second roller are heated.

11. The apparatus of claim 1, wherein the electrode is one of a first electrode and a second electrode,

wherein, the first electrode is disposed on an upper outer surface of the second separator and configured to be positioned between the second separator and the second roller, wherein the first electrode does not contact the second roller, and wherein the second electrode is disposed between the first separator and the second separator.

12. The apparatus of claim 1, wherein the second roller is disposed above the first roller.

13. The apparatus of claim 1, wherein the exterior of the second roller is configured to be spaced apart from the electrode when the electrode is disposed between the first roller and the second roller as to reduce thermal damage of the electrode.

14. A method for manufacturing a unit cell, the method comprising:

providing electrodes, a first separator, and a second separator, wherein the first separator and the second separator are configured to continuously move in a longitudinal direction, and the electrodes are positioned between the first separator and the second separator; and passing the electrodes and the first and second separators between a first roller disposed on a first side of the first and second separators and a second roller disposed on a second side of the first and second separators opposite the first side and aligned with the first roller along an axis and defining an oval shape having a long axis and a short axis, wherein, the second roller rotates to intermittently contact the second separator and press the first and second separators against the first roller when the long axis is perpendicular to the first roller, at portions of the first and second separators which are between adjacent electrodes and to be cut, wherein, the second roller rotates to be spaced apart from the second separator when the short axis is perpendicular to the first roller, when an electrode is disposed between the first roller and the second roller along portions of the first and second separators where the electrode is disposed, and at least one of the first roller or the second roller is heated to a predetermined temperature to intermittently thermally fuse the portions at which the second roller intermittently presses the first separator and the second separator together against the first roller.

15. The method of claim 14, wherein the first roller and the second roller are disposed to thermally fuse the first separator and the second separator before the first separator and the second separator are cut.

16. The method of claim 14, wherein the second roller is made of a material having elasticity so that, when the second separator is pressed, the second separator is pressed by an elastic force of the material of the second roller.

17. The method of claim 14, wherein the electrodes include a first electrode and a second electrode configured to be simultaneously disposed between the first roller and the second roller, wherein, the first electrode is disposed on an upper outer surface of the second separator and configured to be positioned between the second separator and the second roller, wherein the first electrode does not contact the second roller, and wherein the second electrode is disposed between the first separator and the second separator.

* * * * *